US009322299B2

(12) United States Patent (10) Patent No.: US 9,322,299 B2
Conry (45) Date of Patent: Apr. 26, 2016

(54) HEAT ENGINE SHUTTLE PUMP SYSTEM AND METHOD

(71) Applicant: Ronald David Conry, Tallahassee, FL (US)

(72) Inventor: Ronald David Conry, Tallahassee, FL (US)

(*) Notice: Subject to any disclaimer, the term of this patent is extended or adjusted under 35 U.S.C. 154(b) by 155 days.

(21) Appl. No.: 14/013,580

(22) Filed: Aug. 29, 2013

(65) Prior Publication Data

US 2014/0060049 A1    Mar. 6, 2014

Related U.S. Application Data

(60) Provisional application No. 61/694,291, filed on Aug. 29, 2012.

(51) Int. Cl.
| | |
|---|---|
| *F01K 11/02* | (2006.01) |
| *F01K 27/00* | (2006.01) |
| *F01K 13/02* | (2006.01) |
| *F01K 25/08* | (2006.01) |
| *F01K 13/00* | (2006.01) |
| *F01K 25/06* | (2006.01) |
| *F01K 3/12* | (2006.01) |
| *F03G 7/04* | (2006.01) |
| *G01K 3/12* | (2006.01) |

(52) U.S. Cl.
CPC .............. *F01K 11/02* (2013.01); *F01K 13/00* (2013.01); *F01K 13/02* (2013.01); *F01K 25/06* (2013.01); *F01K 25/08* (2013.01); *F01K 27/00* (2013.01); *F03G 7/04* (2013.01); *G01K 3/12* (2013.01)

(58) Field of Classification Search
CPC ......... F01K 11/02; F01K 25/06; F01K 25/08; F01K 27/00; F01K 13/02; F01K 13/00; F01K 3/12; F03G 7/04
See application file for complete search history.

(56) References Cited

U.S. PATENT DOCUMENTS

| | | | | |
|---|---|---|---|---|
| 3,995,429 A | * | 12/1976 | Peters | 60/641.8 |
| 4,698,973 A | * | 10/1987 | Johnston | 60/670 |
| 4,805,410 A | * | 2/1989 | Johnston | F01K 9/00 60/651 |
| 5,000,003 A | * | 3/1991 | Wicks | 60/618 |
| 6,467,273 B1 | * | 10/2002 | Lott et al. | 60/780 |

* cited by examiner

*Primary Examiner* — Kenneth Bomberg
*Assistant Examiner* — Wesley Harris
(74) *Attorney, Agent, or Firm* — J. Wiley Horton

(57) ABSTRACT

A heat engine including a novel method for transferring working fluid from the low pressure side of the cycle back to the high pressure side. The invention includes one or more transfer tanks connecting the condenser to the boiler. Each transfer tank is connected to the condenser by a fill line and connected to the boiler by a dump line. Gravity and/or small transfer pumps are used to transfer the working fluid horn the low pressure side, through the transfer tank or tanks, and then to the high pressure side.

8 Claims, 9 Drawing Sheets

HEAT ENGINE SHUTTLE PUMP SYSTEM AND METHOD

This is a provisional patent application filed pursuant to 37 C.F.R. §1.53(e).

CROSS-REFERENCES TO RELATED APPLICATIONS

Pursuant to the provisions of 37 C.F.R. §1.53(c), this non-provisional patent application claims the benefit of a previously filed provisional application. The provisional application was filed on Aug. 29, 2012 and assigned Ser. No. 61/694,291. The provisional application listed the same inventor.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of energy. More specifically, the invention comprises a heat engine cycle incorporating a novel shuttle pump for transferring working fluid from the low pressure side of the heat engine to the high pressure side.

2. Description of the Related Art

FIG. 1 shows a schematic depiction of a simple prior art heat engine 14. A working fluid is circulated continuously through the engine. Station "1" contains relatively cool liquid working fluid that has exited condenser 16. Pump 18 pressurizes this working fluid. Station "2" contains pressurized liquid working fluid (still relatively cool). The pressurized working fluid is then fed into boiler 10.

A heat source is applied to boiler 10 to transform the incoming liquid, working fluid into a gas. At the boiler's exit point the working fluid is in a gaseous state, and may in some instances be heated well beyond the boiling point ("superheated"). Thus, station "3" contains pressurized gaseous working fluid. The working fluid is next expanded through turbine 12. The mechanical energy extracted by the turbine is typically used to power a generator 28 (but may be used for other purposes as well).

Station "4" represents the turbine exhaust. At this point the working fluid is a relatively low pressure vapor, though it may be partially condensed back to a liquid. Condensation in the turbine is generally undesirable as it may rapidly erode the turbine components. Thus—in most applications—the turbine exhaust will contain little to no condensed working fluid.

The turbine exhaust must be condensed back to a liquid in order to feed it into boiler 10. Condenser 16 is provided for this purpose. The condenser extracts heat from the turbine exhaust in order to condense the gaseous working fluid. By the time the working fluid reaches the condenser exit, it is preferably in a completely liquid state. The working fluid is then fed into pump 18 and the cycle repeats.

The cycle shown in FIG. 1 is quite simple. Those skilled in the art will know that many variations of increasing complexity are known. These include multiple pumping stages, separate superheating components, etc. The present invention will operate as part of many different heat engine cycles and the invention should by no means be thought of as being limited to the simple example of FIG. 1.

Likewise, although steam has traditionally been the most common working fluid for heat engines, the invention can function with virtually any type of working fluid. In recent years there has been increasing interest in heat engines capable of recovering energy from relatively low temperature heat sources. Steam is ill-suited to these applications. Organic Rankine cycle ("ORC") heat engines are well suited to the recovery of energy from these sources and these engines employ different working fluids. Examples of the working fluids used in ORC heat engines include R-22, R-134a, Dowtherm E, and Genetron 245fa. The boiler in an ORC is sometimes referred to as an "evaporator." The function of this component in the heat engine is the same and so it may be referred to as a boiler, an evaporator, or a boiler/evaporator.

Heat engines are customarily thought of as being divided into a "high side" (high pressure side) and a "low side" (low pressure side). In FIG. 1, high side 20 includes everything between, the pump discharge and the turbine inlet. Low side 22 includes everything from the turbine outlet to the pump inlet. Within the high side the pressure remains constant (ignoring frictional head losses). Within the low side, pressure also remains constant (again ignoring frictional losses).

The working fluid must therefore be transferred from the high side to the low side and back again. Turbine 12 passes working fluid from the high side to the low side (by expanding it, which is why such devices are sometimes more generally referred to as "expanders"). Pump 18 passes working fluid from the low side back to the high side.

Pump 18 is typically a centrifugal mechanical pump which pulls in liquid working fluid from an axial intake and accelerates it outward (by spinning it) for collection in a pressurized volute. Such a pump consumes significant energy and thereby reduces the overall efficiency of the heat engine. Centrifugal pumps also represent significant cost, maintenance, and reliability concerns. It would therefore be preferable to provide a different system for transferring working fluid from the low side to the high side of a heat engine. Such an alternate system would preferably eliminate the pump or at least significantly reduce the size of the pump required. The present invention provides such a device.

BRIEF SUMMARY OF THE PRESENT INVENTION

The present invention comprises a heat engine including a novel method for transferring working fluid from the low pressure side of the cycle back to the high pressure side. The invention includes one or more transfer tanks connecting the condenser to the boiler. Each transfer tank is connected to the condenser by a fill line and connected to the boiler by a discharge line.

Flow restricting valves are provided in the fill and discharge lines. These restrict the direction of flow so that working fluid flows from the condenser into the transfer tank and then into the boiler. The flow restricting valves prevent flow in the opposite direction.

Each transfer tank is also connected to a pair of vent lines. A first vent line goes from the transfer tank to the condenser. A second vent line goes from the transfer tank to the boiler. Each of these vent lines is preferably controlled by an automatic valve, such as a solenoid-actuated valve.

Cycling of the transfer tank ordinarily commences after pressure difference has been established between the high side (the boiler) and the low side (the condenser). In the fill cycle the first vent line is connected to the condenser while the second vent line is shut off. The valve in the vent line is opened and gravity causes working fluid to flow from the condenser into the transfer tank until the transfer tank is full. The first vent line vents the gas displaced from the transfer tank into the condenser. The first vent line is then closed and the second vent line is connected to the boiler. The valve in the fill line is closed and the valve in the discharge line is opened. Liquid working fluid then flows down through the discharge line into the boiler under the influence of gravity. A new fill cycle is then commenced by reopening the first vent line and closing the second vent line.

A more advanced embodiment includes a first transfer pump which assists the transfer of working fluid from the condenser to the transfer tank or tanks. A second transfer pump is provided to assist the transfer of working fluid from the transfer tank or tanks to the boiler/evaporator. Although pumps are actually employed in this embodiment, the power consumed by these pumps is far less than the power consumed by the pump in a prior art system such as shown in FIG. 1—even though the flow rate for the working fluid is the same.

REFERENCE NUMERALS IN THE DRAWINGS

| 10 | evaporator/boiler | 12 | turbine |
| 14 | heat engine | 16 | condenser |
| 18 | pump | 20 | high side |
| 22 | low side | 24 | first vent line |
| 26 | second vent line | 28 | generator |
| 29 | first fill line | 30 | first dump line |
| 32 | second fill line | 34 | second dump line |
| 36 | first transfer tank | 38 | second transfer tank |
| 40 | first check valve | 42 | second check valve |
| 44 | third check valve | 46 | fourth check valve |
| 48 | third vent line | 50 | fourth vent line |
| 52 | first tee | 54 | second tee |
| 56 | first solenoid valve | 58 | second solenoid valve |
| 60 | third solenoid valve | 62 | fourth solenoid valve |
| 63 | level sensor | 64 | level sensor |
| 66 | level sensor | 68 | level sensor |
| 70 | turbine feed line | 72 | turbine discharge line |
| 74 | liquid receiver | 76 | first pump |
| 78 | second pump | 80 | discharge line |
| 82 | third tee | 84 | fourth tee |
| 86 | fifth solenoid valve | 88 | sixth solenoid valve |
| 90 | seventh solenoid valve | 92 | eighth solenoid valve |
| 94 | discharge line | 96 | third transfer tank |
| 98 | fourth transfer tank | 100 | recuperator |
| 102 | liquid preheater | 104 | throttling valve |
| 106 | discharge manifold | 108 | input manifold |
| 110 | condenser vent manifold | 112 | evaporator vent manifold |

DETAILED DESCRIPTION OF THE INVENTION

The invention can function using a single transfer tank which alternately fills from the condenser and then dumps into the boiler. However, in order to provide more continuous flow from the low side to the high side, it is preferable to provide two or more transfer tanks which are advantageously sequenced.

Figure 2:
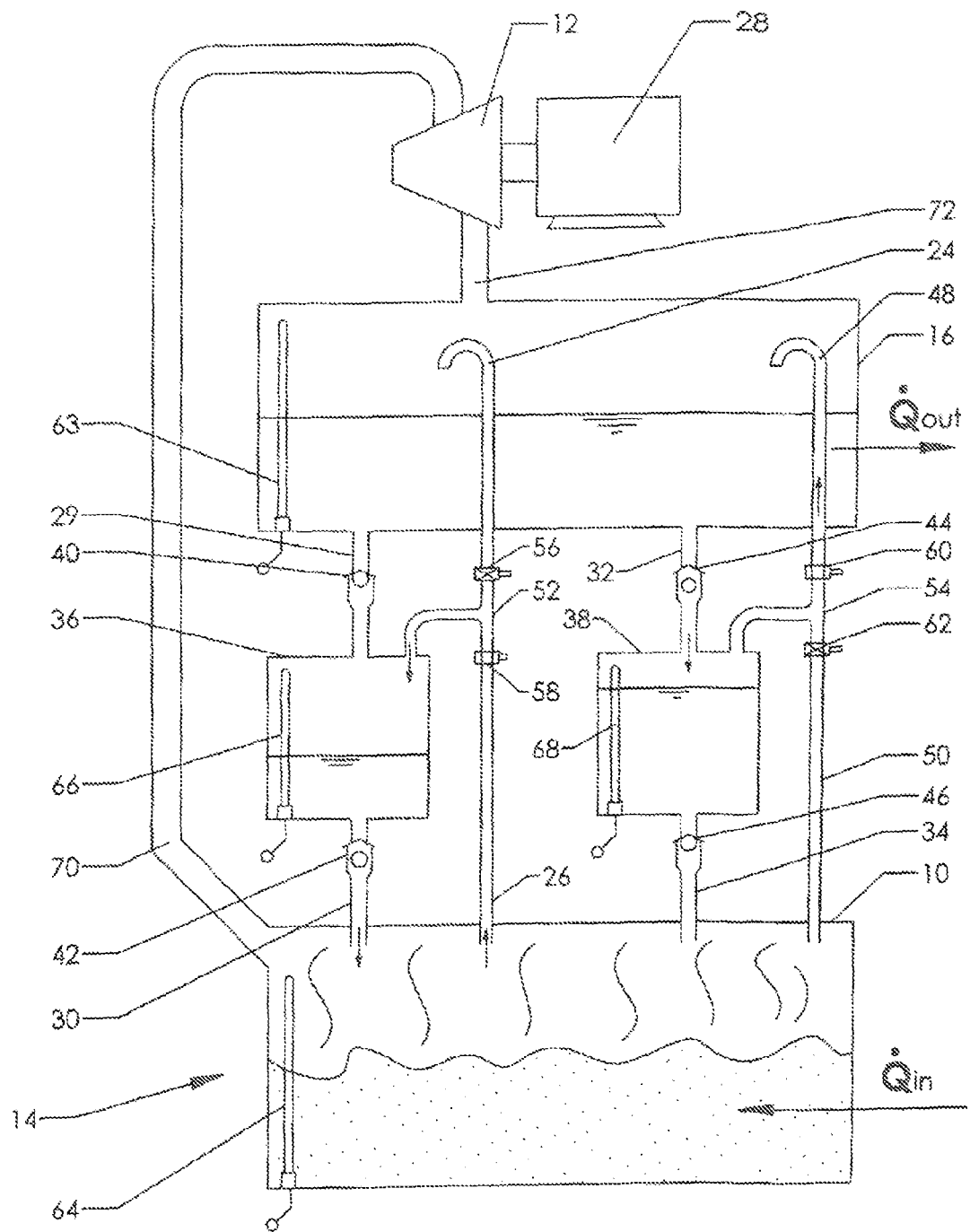
FIG. 2 is a schematic view, showing the present invention in operation.

FIG. 2 shows a fairly simple example using a pair of transfer tanks operating in unison. The reader should bear in mind that three, four, or more transfer tanks could be employed using the same conceptual approach.

As gravity is the sole motive force behind the transfer in this simple embodiment, it is important to place the header of the liquid emerging from the condenser above the transfer tanks. It is also preferable to place the transfer tanks above the boiler.

The embodiment of FIG. 2 is a conventional heat engine except thr the substitution of the transfer tanks for a pump. Boiler/evaporator 10 receives an energy input in the form of heat in order to boil and vaporize a working fluid under pressure. The pressurized vaporous working fluid is then fed via turbine feed line 70 to turbine 12. The turbine expands the vaporized working fluid and thereby extracts energy to drive generator 28. The turbine exhaust then feeds into condenser 16 via turbine exhaust 72.

As in the prior art, the condenser condenses the low-pressure working fluid back into a liquid. The condenser and the boiler are shown as simple "tanks." In reality, they will likely assume a more complex form (such as the flow of working fluid undergoing a serpentine path through baffles, etc.). However, unlike the prior art, transfer tanks 36 and 38 take the place of the centrifugal pump.

Transfer tank 36 is connected to condenser 16 by first till line 29. It is likewise connected to boiler 10 via first dump line 30. Two vent lines are also connected to first transfer tank 36. These are first vent line 24 (which vents into the upper portion of condenser 16) and second vent line 2 (which vents into the upper portion of boiler 10). Each vent line is independently controlled by a valve, which is preferably an automatic valve which can be electrically controlled. In the embodiment of FIG. 2, two solenoid, valves are used: first solenoid valve 56 and second solenoid valve 58. First tee 52 joins the two vent lines together and they are then connected to first transfer tank 36. Of course, the two vent lines could simply be connected directly to the transfer tank without using a tee.

Flow through first fill line 29 is regulated by a suitable flow control device. Although this device can be an automatically controlled valve, in the simple embodiment of FIG. 2 it is a check valve. First check valve 40 allows flow to proceed from the condenser to the first transfer tank, but prevents flow in the opposite direction. Flow through first dump line 30 is regulated by second check valve 42, which only allows flow in the direction from the first transfer tank to the boiler.

Second transfer tank 38 is connected using the same type of components. Second fill line 32 connects the second transfer tank to condenser 16. Second dump line 34 connects the second transfer tank to boiler 10. Third check valve 44 regulates flow in second fill line 32 while fourth check valve 46 regulates flow in second dump line 34.

Second tee 54 connects second transfer tank 38 to two vent lines. Third vent line 48 connects the second tee to the condenser while fourth vent line 50 connects the second tee to the boiler. Flow in the third vent line is selectively controlled by third solenoid valve 60. Flow in the fourth vent line is controlled by fourth solenoid valve 62.

In an embodiment using a pair of transfer tanks (such as shown in FIG. 2) it is preferable to sequence the tanks so that one is filling while the other is dumping. In the state shown in FIG. 2, first transfer tank 36 is dumping while second transfer tank 38 is filling. First solenoid valve 56 is closed. Second solenoid valve 58 is open. This configuration connects second vent line 26 to first transfer tank 36. Before the dump cycle begins, the pressure in the first transfer tank is equal to the pressure in the condenser (part of the low side of the system). Opening second solenoid valve 58 applies the relatively high boiler pressure to first transfer tank 36 and raises its pressure to that of the high side of the system. First check valve 40 is thereby closed and the pressure within the first transfer tank and the boiler are equalized via second vent line 26. The weight of the liquid working fluid within the first transfer tank forces second check valve 42 open (The weight produces a sufficient pressure differential to open the valve, or in the case of a positively controlled valve the valve would be commanded open). This allows the liquid working fluid to flow down into boiler 10 as indicated. Vaporized working fluid from the boiler flows into the first transfer tank to replace the displaced volume of liquid.

As stated previously, FIG. 2 shows second transfer tank 38 in the filling part of the cycle. Prior to the commencement of the filling cycle it was completing the dump cycle—during which time its pressure was equal to that of the evaporator (part of the high side of the system). Third solenoid valve 60 is opened to commence the fill side while fourth solenoid valve 62 is closed. The high pressure within the second transfer tank vents into the condenser via third vent line 48 and the pressure within condenser 16 and second transfer tank 38 are equalized. The relatively high pressure within the boiler forces fourth check valve 46 closed. The weight of the liquid working fluid within condenser 16 forces open third check valve 44 and liquid working fluid flows down into the second transfer tank as shown. Third vent line 48 allows gaseous working fluid displaced by the incoming liquid volume to escape into the condenser.

The solenoid valves are maintained in the configuration shown in FIG. 2 until first transfer tank 36 is emptied and second transfer tank 38 is filled. Each of the four solenoid valves is then switched to the opposite state to begin filling the first transfer tank and emptying the second one.

Figure 3:
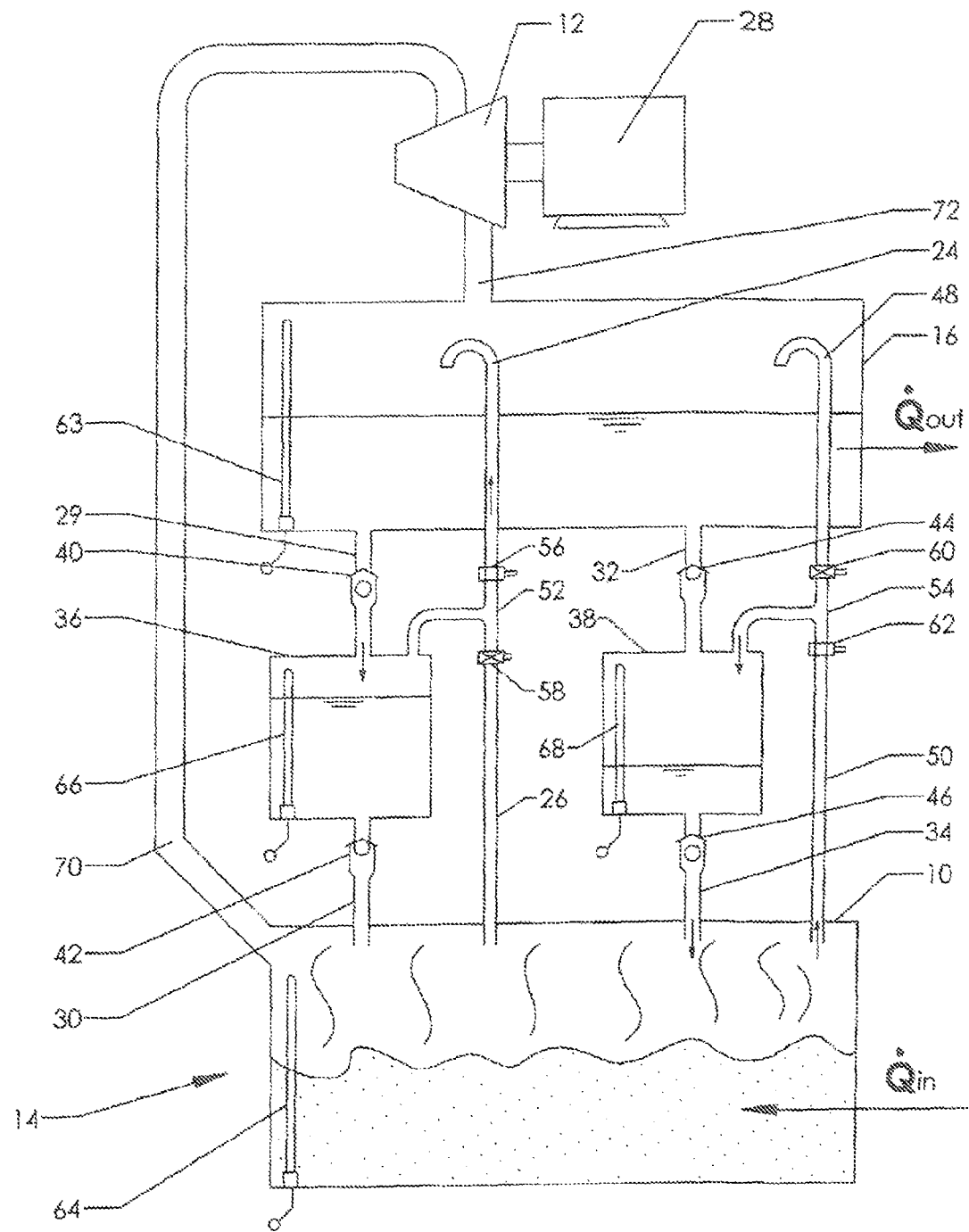
FIG. 3 is a schematic view, showing the present invention in operation.

This second state is shown in FIG. 3. First solenoid valve 56 is open; second solenoid valve 58 is closed. This connects first vent line 24 to condenser 16. Gravity forces first check valve 40 open and causes liquid working fluid to flow into first transfer tank 36. Pressure within the boiler holds second check valve 42 closed.

Third solenoid valve 60 is closed while fourth solenoid valve 62 is opened. The pressure within second transfer tank 38 is thereby brought up to the pressure within the boiler. Third check valve 44 is thereby closed. Gravity forces fourth check valve 46 open, which allows the liquid working fluid within second transfer tank 38 to dump into the boiler.

The reader will thereby appreciate that the solenoid valves can be cycled in a manner that keeps one transfer tank emptying into the boiler while the other transfer tank is filling from the condenser. Unwanted backflow is prevented by the operation of the four check valves, or other suitable flow control devices. Of course, there may be a small amount of "blow back" into the condenser each time the cycle is reversed. As an example, at the end of the cycle shown in FIG. 2, the pressure within first transfer tank 36 is the same as the pressure in boiler 10. When the solenoid valves are reversed to the configuration shown in FIG. 3, the pressure within the first transfer tank will vent into the condenser. However, since the volume of the condenser is much greater than the transfer tank, the "blow back" phenomenon is brief and it does not significantly impair the performance of the system.

It is preferable to automate the operation of the system using a microcontroller, computer, or similar device. Level sensors are preferably also provided so that the controlling device has current information as to the liquid level in all the components. Thus, level sensor 63 is provided in condenser 16. Level sensor 64 is provided in boiler 10. Level sensor 66 is provided in first transfer tank 36. Level sensor 68 is provided in second transfer tank 38. These provide information as to the current liquid level in each of these vessels.

The control system can use the liquid level information to control the state of the solenoid valves and maintain the desired flow cycles. Pressure and temperature sensors may also be provided to facilitate proper control. Throttling valves may be substituted for the on-off solenoid valves so that the flow rates may be regulated as desired.

The control system may also be used to automate the start sequence of the system. Prior art heat engines employing a centrifugal pump rapidly establish a pressure difference between the high and low sides by switching on the pump. In the present invention it is possible to "bootstrap" the device by allowing the heat input to the boiler to gradually raise the pressure as the working fluid within the boiler vaporizes. However, it may be advantageous to rapidly increase the boiler pressure by providing secondary valves or an auxiliary pump. If valves alone are used a secondary valve would be placed in turbine feed line 70. Others might be placed in the discharge lines from each of the transfer tanks. These secondary valves would close all possible exit paths from the boiler so that pressure within the boiler would rise more rapidly. Once a suitable pressure threshold is obtained, the secondary valves would be opened and the cycling of the transfer tanks would commence as described previously.

Those skilled in the art will realize that the hardware and functions shown for each individual transfer tank may be applied to additional transfer tanks. It may be desirable in some installations to provide three, four, or more transfer tanks transferring working fluid from the low side to the high side.

Of course, the use of gravity feed in the simple embodiment of FIGS. 2 and 3 makes it preferable to place the condenser above the boiler/evaporator. A significant height difference may be needed to create sufficient head, which may be impractical in some installations. The flow rate is also limited by the available motive force (gravity). Thus, in many instances, it will be advantageous to use the basic principles disclosed in FIGS. 2 and 3 in conjunction with one or more relatively low power transfer pumps.

Figure 4:
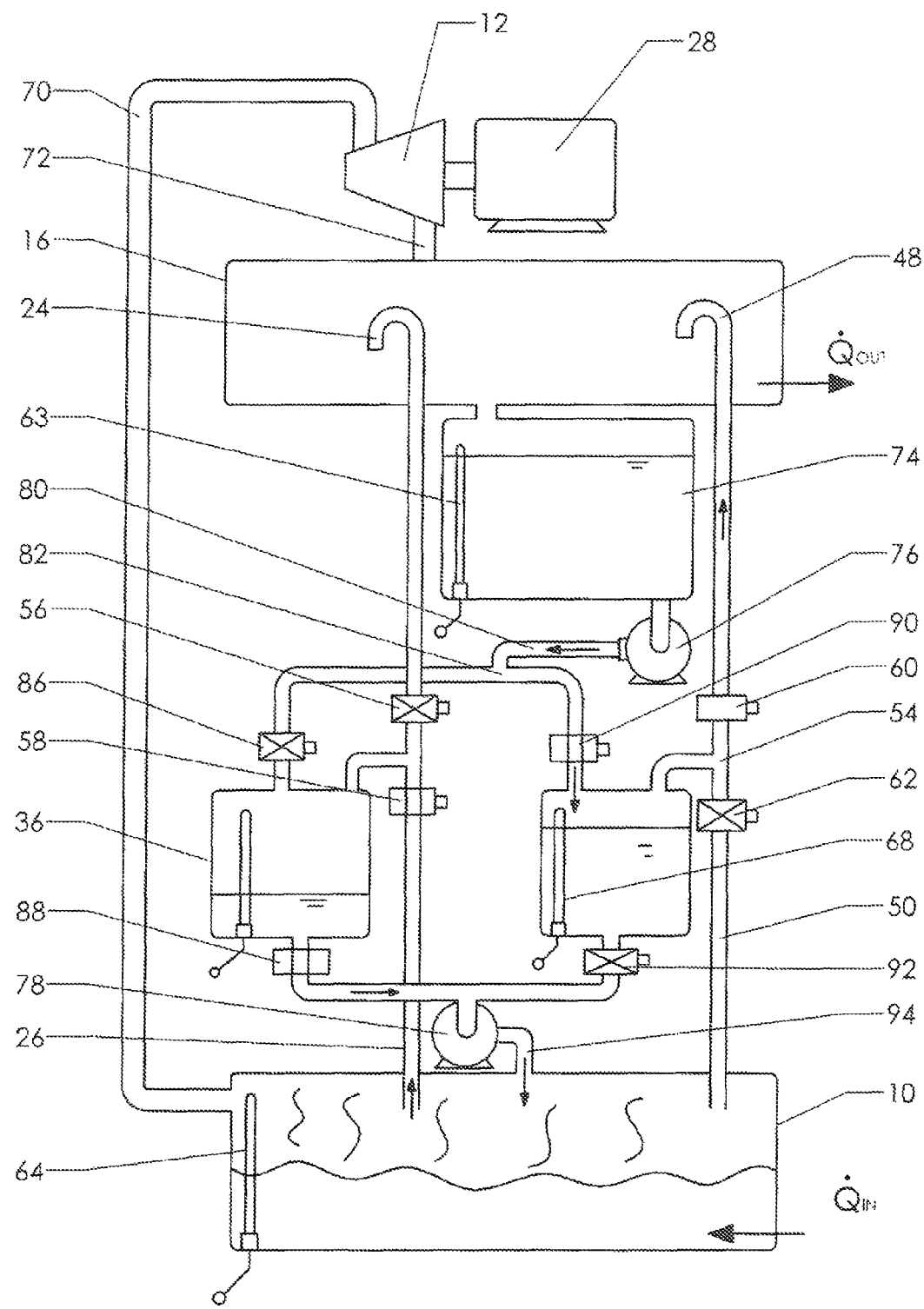
FIG. 4 is a schematic view, showing the operation of an alternate embodiment employing one or more transfer pumps.
Figure 5:
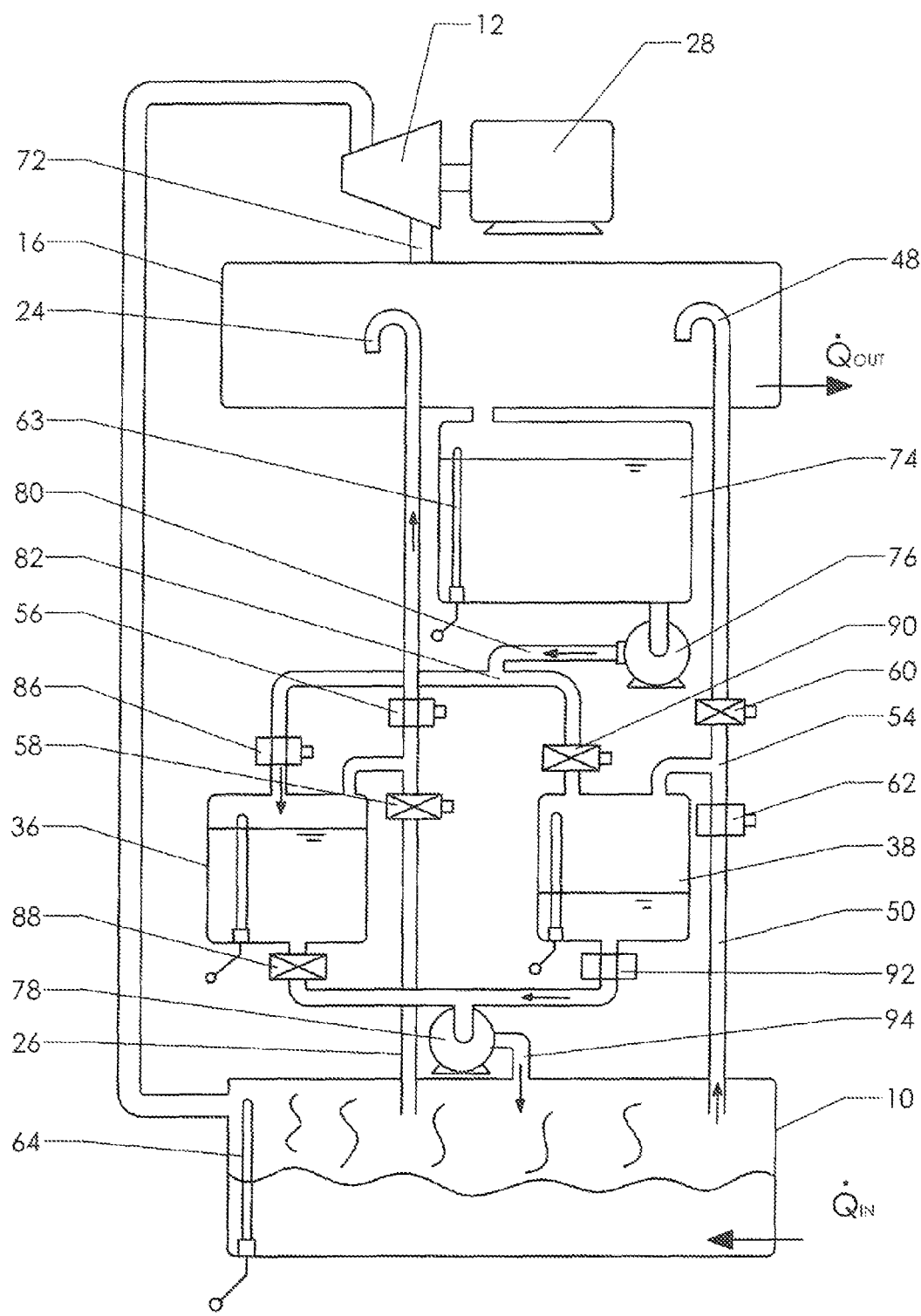
FIG. 5 is a schematic view, showing the operation of the alternate embodiment of FIG. 4.

The embodiment of FIGS. 4 and 5 incorporates the features of the basic embodiment with some notable enhancements. In FIG. 4, liquid receiver 74 is configured to receive liquid working fluid delivered by the condenser. First pump 76 draws in liquid working fluid from liquid receiver 74. The use of the liquid receiver ensures that the pump does not ingest any gaseous working fluid—which might occur if first pump 76 were connected directly to the condenser.

Discharge line 80 leads from first pump 76 to third tee 82. Third tee 82 is connected to first transfer tank 36 and second transfer tank 38 via two flow control devices—in this case fifth solenoid valve 86 and seventh solenoid valve 90. These two valves direct the pressurized output of first pump 76 to the appropriate transfer tank.

The output of each of the two transfer tanks is likewise controlled by a flow control device. The output of first transfer tank 36 is controlled by sixth solenoid valve 88, while the output of second transfer tank 38 is controlled by eighth solenoid valve 92. The output of the sixth and eighth solenoid valves leads to the input of second pump 78. Second pump 78 feeds discharge line 94, which empties into evaporator 10. The vent lines on the two transfer tanks are the same as for the embodiment of FIGS. 2 and 3, and they operate in the same manner.

Many different types of pumps may be used for the two transfer pumps. Relatively low power and low cost positive displacement pumps will perform satisfactorily. The reader should note that while the condenser is shown being above the evaporator in FIGS. 4 and 5, this is merely done for ease of comparison with the embodiment of FIGS. 2 and 3. The use of the transfer pumps in this embodiment means that the condenser need not be above the level of the evaporator and in fact the height of the two components may be the same and in some instances even reversed (provided that there is adequate subcooling so that liquid receiver 74 contains liquid working fluid). In such embodiment gravity would obviously not be used to assist the transfer of working fluid.

The operation of the embodiment of FIGS. 4 and 5 will now be described in detail. In FIG. 4, first transfer tank 36 is discharging into the evaporator while second transfer tank 38 is filling from the condenser. Fifth solenoid valve 86 is closed. Sixth solenoid valve 88 is open—thereby connecting the output of the first transfer tank to fourth tee 84 and the intake of second pump 78. Second solenoid valve 58 is open, thereby connecting second vent line 26 to the evaporator. First vent line 24 is closed.

Second pump 78 is energized to actively pump the contents of first transfer tank 36 into the evaporator. The open vent line allows gas from the evaporator to fill the emptying volume of the first transfer tank.

Seventh solenoid valve 90 is open—thereby connecting discharge line 80 of first pump 76 to second transfer tank 38. Third solenoid valve 60 is opened in order to vent the second transfer tank to the condenser. First pump 76 is then energized to actively pump condensed working fluid from liquid reservoir into second transfer tank 38. This configuration is maintained until the first transfer tank is empty and the second transfer tank is full. The valve configurations are then switched so that the first transfer tank fills and the second transfer tank empties.

The switched configuration is shown in FIG. 5. Filth solenoid valve 86 is open. First solenoid valve 56 is also open in order to vent the first transfer tank to the condenser. Sixth solenoid valve 88 is closed. Seventh solenoid valve 90 and third solenoid valve 60 are also closed. First pump 76 is energized in order to pump liquid working fluid from liquid receiver 74 to first transfer tank 36.

Eighth solenoid valve 92 is open to connect the output of the second transfer tank to second pump 78. Fourth solenoid valve 62 is open to vent the second transfer tank to the evaporator. Second pump 78 is energized in order to pump working fluid from the second transfer tank into the evaporator. Liquid level sensors are preferably provided in each container—such as level sensor 63 in liquid receiver 74—so that the control system can maintain appropriate liquid levels during the transfer process.

Although transfer pumps are used in this embodiment, the power consumed by these pumps is roughly an order of magnitude less than the pump or pumps required in a prior art system. Thus, the controlled pressurization and venting provided in the present invention offers a significant advantage.

Although only two pumps are shown fir the embodiment of FIG. 5, one could just as easily provide a pair of pumps—one intake and one discharge—for each transfer tank. One could also provide an embodiment operating under the same principles which includes three, four, or more transfer tanks. FIGS. 6 through 9 illustrate a four-tank embodiment in which the tanks are operated in a repeating cycle.

Figure 6:
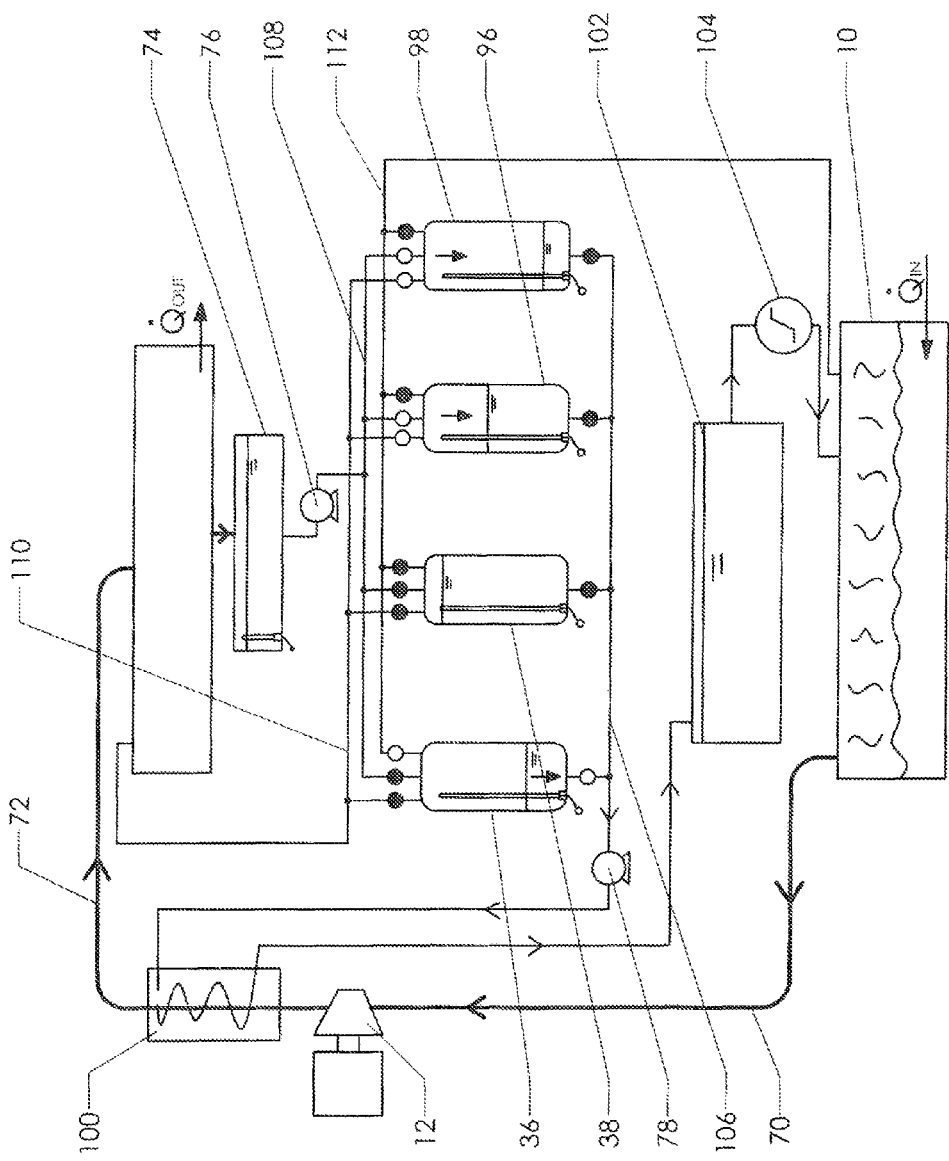
FIG. 6 is a schematic view, showing another alternate embodiment employing four transfer tanks and one more transfer pumps.

FIG. 6 shows the four transfer tanks—first transfer tank 36, second transfer tank 38, third transfer tank 96, and fourth transfer tank 98—in different states. The state of each transfer tank cycles in the successive drawing figures (proceeding from FIG. 6 through FIG. 9). Each will be described in detail, but the following table provides a quick reference to the state of each tank in each figure.

TABLE ONE

Figure 7:
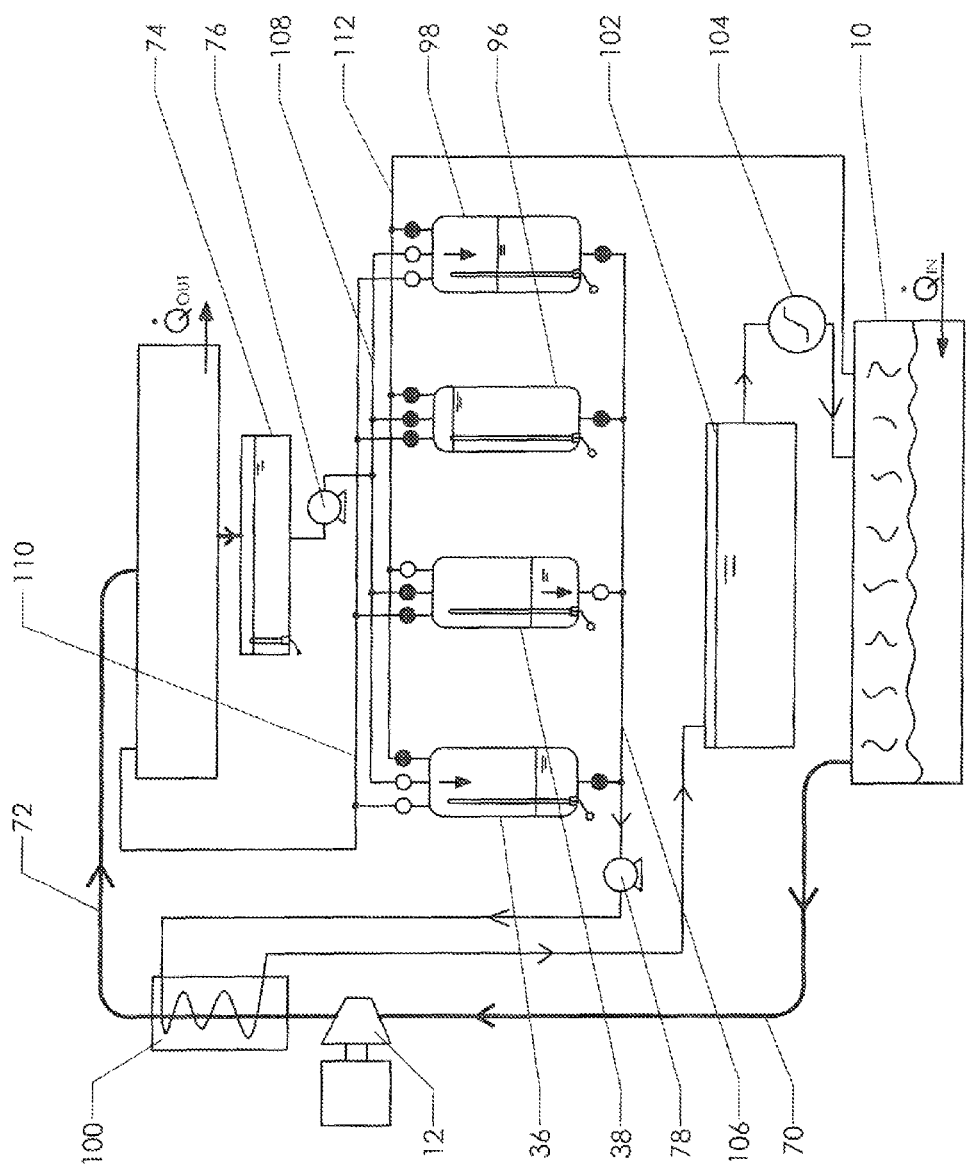
FIG. 7 is a schematic view, showing the operation of the embodiment of FIG. 6.
Figure 8:
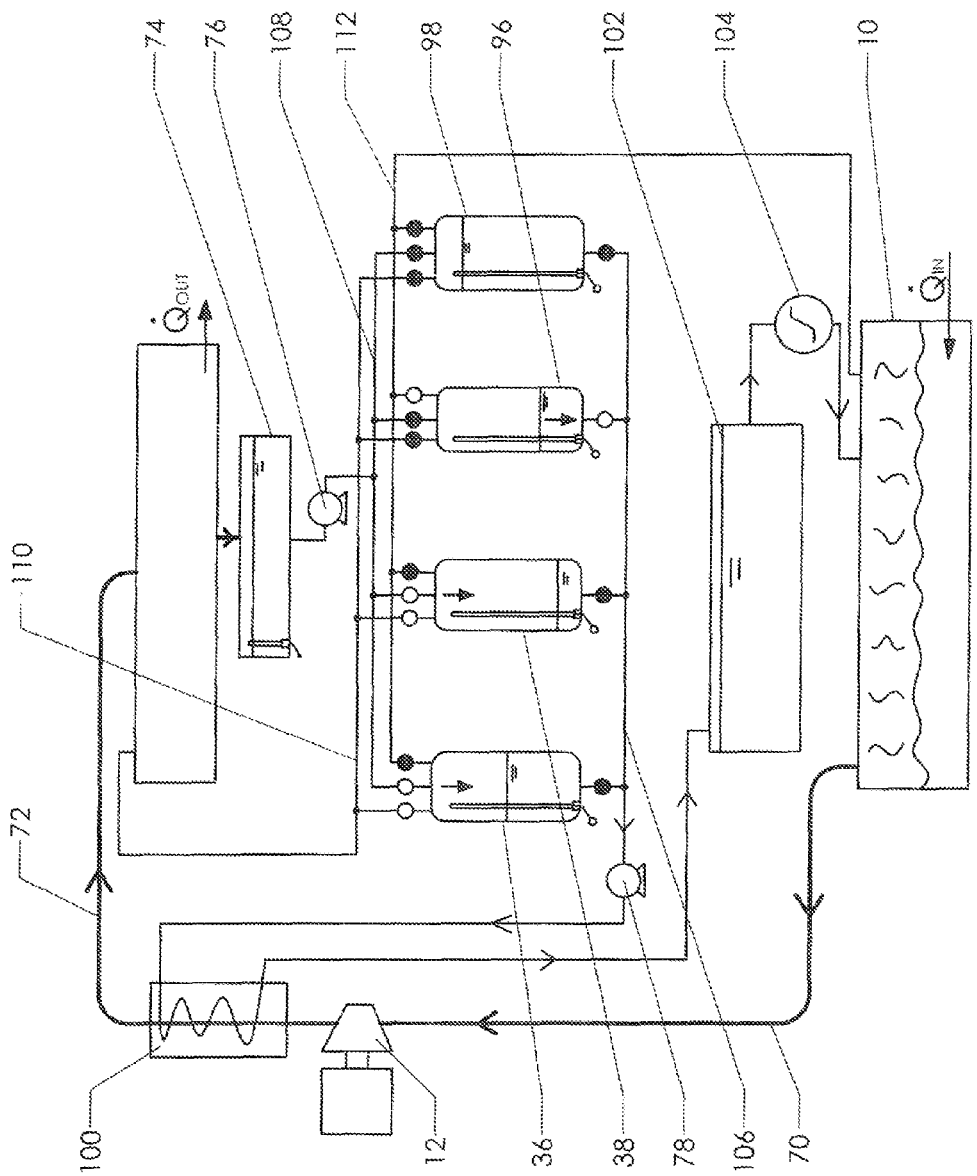
FIG. 8 is a schematic view, showing the operation of the embodiment of FIG. 6.
Figure 9:
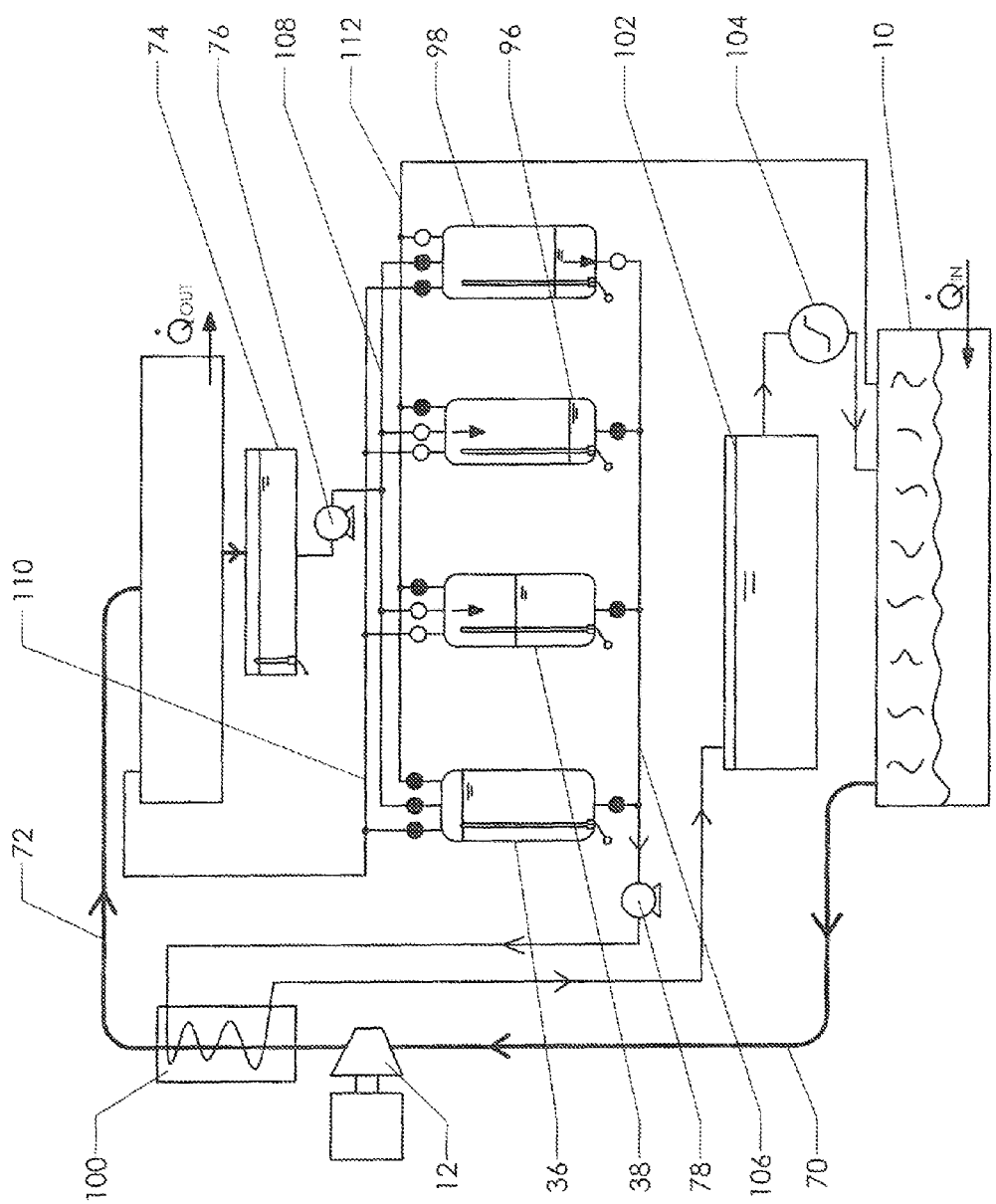
FIG. 9 is a schematic view, showing the operation of the embodiment of FIG. 6.

|        | TRANSFER TANK 1      | TRANSFER TANK 2      | TRANSFER TANK 3       | TRANSFER TANK 4           |
|--------|----------------------|----------------------|-----------------------|---------------------------|
| FIG. 6 | DISCHARGING         | FULL                 | FILLING, ½ FULL       | FILLING, BEGINNING        |
| FIG. 7 | FILLING, BEGINNING  | DISCHARGING          | FULL                  | FILLING, ½ FULL           |
| FIG. 8 | FILLING, ½ FULL     | FILLING, BEGINNING   | DISCHARGING           | FULL                      |
| FIG. 9 | FULL                 | FILLING, ½ FULL      | FILLING, BEGINNING    | DISCHARGING               |

The valves and "plumbing" to each of the transfer tanks can be arranged in many different configurations, so the actual configuration used in FIG. 6 should properly be viewed as one example among many possibilities. The transfer pipes in FIG. 6 are schematically represented as solid lines. A dot is placed at each intersection between pipes (which represents a plumbing "tee" or similar element). The valves in FIG. 6 are schematically represented as circles which are either empty (indicating an open valve) or fall (indicating a closed valve). This nomenclature is familiar to those skilled in the art.

The reader will note in FIG. 6 that each transfer tank has three valves near its upper end and one valve near its lower end. The single valves near the lower ends are discharge valves. The valve in the middle of the top of each transfer tank is an input valve. The valves on the right and the left of the top of each transfer tank are vent valves which selectively connect each transfer tank to either the condenser or the evaporator. The connection is actually made through one of two manifolds. Condenser vent manifold 110 connects a first set of four vent valves to the condenser. Evaporator vent manifold 112 connects a second set of four vent valves to the evaporator.

In FIG. 6, the discharge valve of first transfer tank 36 is open. The right hand vent valve connects first transfer tank 36 to evaporator vent manifold 112. The left hand vent valve and the input valve are both closed. Second pump 78 is energized to positively pump the contents of first transfer tank 36 through recuperator 100 and then to liquid preheater 102.

From the liquid preheater, throttle valve 104 sends collected working fluid to evaporator 10 as required to maintain the desired level of circulation.

The recuperator and the liquid preheater are optional items (as is liquid receiver 74). They are desirable in many applications, however. The turbine exhaust is typically a fairly saturated vapor, but it will often be several degrees above the condensation point (This is a useful margin to ensure that condensation does not occur inside the turbine). Recuperator 100—which is simply a heat exchanger—extracts heat from the vapor and assists in the condensation process. The heat is transferred to the liquid working fluid on the "high" side of the system, thereby raising its temperature and reducing the amount of energy required to vaporize it in the evaporator.

Liquid preheater 102 is a collection point which allows the flow of working fluid to be more easily controlled as it is fed into evaporator 10. It will be advantageous in some applications to provide heat input at this point to further raise the temperature of the liquid working fluid. One way to do this is to circulate some working fluid in a cooling jacket around the turbine casing and then through the liquid preheater. Many other approaches to preheating are known in the art.

Returning now to the four transfer tanks in FIG. 6—the reader will recall that first transfer tank 36 is discharging its volume of liquid working fluid. Second transfer tank 38 has just completed filling. Its input valve has just closed and its vent valve connecting it to the condenser vent manifold has just closed. Its discharge valve is closed.

Third transfer tank 96 is in the middle of the fill cycle (It is half full). Its input valve is open and its vent valve connecting it to condenser vent manifold 110 is open. Its discharge valve is closed. Fourth transfer tank 98 is at the very start of the fill cycle. Its input valve is open and its vent valve connecting it to condenser vent manifold 110 is open. Its discharge valve is closed.

The cycling of the four transfer tanks is preferably automated using a computer-based control system. Sensors are preferably provided to determine the amount of working fluid in each transfer tank. Numerous other features may be added to the fairly simple schematic of FIG. 6. As one example, preheat energy can be provided to the transfer tanks to raise the temperature of the liquid working fluid while it resides in the transfer tanks.

FIG. 7 shows the next stage of the cycle. Second transfer tank 38 is discharging its volume of liquid working fluid. Third transfer tank 96 has just completed filling. Its input valve has just closed and its vent valve connecting it to the condenser vent manifold has just closed. Its discharge valve is closed.

Fourth transfer tank 98 is in the middle of the fill cycle (It is half full). Its input valve is open and its vent valve connecting it to condenser vent manifold 110 is open. Its discharge valve is closed. First transfer tank 36 is at the very start of the fill cycle. Its input valve is open and its vent valve connecting it to condenser vent manifold 110 is open. Its discharge valve is closed.

FIG. 8 shows the next stage. Third transfer tank 96 is discharging its volume of liquid working fluid. Fourth transfer tank 98 has just completed filling. Its input valve has just closed and its vent valve connecting it to the condenser vent manifold has just closed. Its discharge valve is closed.

First transfer tank 36 is in the middle of the fill cycle (It is half full). Its input valve is open and its vent valve connecting it to condenser vent manifold 110 is open. Its discharge valve is closed. Second transfer tank 38 is at the very start of the fill cycle. Its input valve is open and its vent valve connecting it to condenser vent manifold 110 is open. Its discharge valve is closed.

FIG. 9 shows the final stage. Fourth transfer tank 98 is discharging its volume of liquid working fluid. First transfer tank 36 has just completed filling. Its input valve has just closed and its vent valve connecting it to the condenser vent manifold has just closed. Its discharge valve is closed.

Second transfer tank 38 is in the middle of the fill cycle (It is half full). Its input valve is open and its vent valve connecting it to condenser vent manifold 110 is open. Its discharge valve is closed. Third transfer tank 96 is at the very start of the fill cycle. Its input valve is open and its vent valve connecting it to condenser vent manifold 110 is open. Its discharge valve is closed.

The reader should bear in mind that the cycle does not have to operate continuously (as the previous description implies). All tanks might be filled and waiting for a period before they dump in sequence. All tanks might wait for an appropriate preheat interval and then dump at once. All these are options under the present invention.

Figure 1:
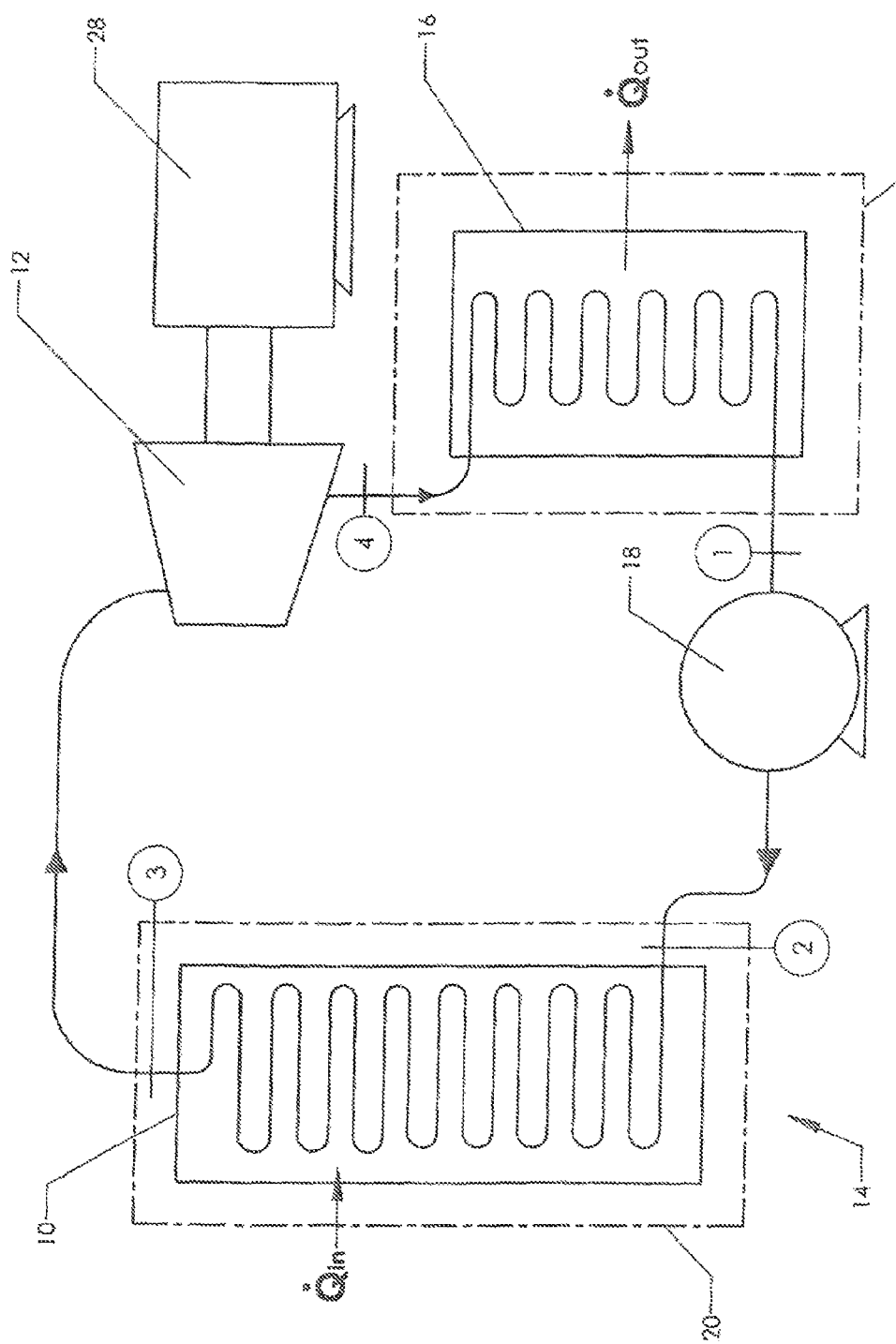
FIG. 1 is a schematic view, showing a prior art heat engine.

The selection of the pumps to be used in the present invention is a matter of detailed engineering design. However, the reader may benefit from some knowledge of exemplary sizes. In the prior art system of FIG. 1, pump 18 was sized at 14 horsepower. A heat engine made according to the present invention (and having a comparable power output), would use two 1 horsepower pumps (for first pump 76 and second pump 78). Thus, the reduction in pumping energy input required is roughly one order of magnitude.

As stated previously, computer control could be used for the cycling of the valves. However, a simple mechanical control system could be used as well. A rotating mechanical camshaft could be employed, to open and close all the valves in the desired sequence and for the desired length of time. The valves would then be cam actuated valves rather than solenoid valves.

Although the preceding description contains significant detail, it should not be construed as limiting the scope of the invention but rather as providing illustrations of the preferred embodiments of the invention. As an example, when viewing the system of FIG. 6 one may easily conceive an embodiment in which second pump 78 is present but first pump 76 is not. The inventive, process could be carried out in many different ways. Thus, the scope of the invention should be fixed by the claims ultimately presented rather than the examples given.

Having described my invention, I claim:

1. A method of transferring working fluid with a he engine from a condenser tune of apparatus, comprising:
   a. Providing a condenser having an internal condenser pressure, said condenser having said working fluid in a liquid form, said working fluid having a first surface level;
   b. Providing an evaporator having an internal evaporator pressure, said evaporator having said working fluid in a liquid form, said working food having a second surface level, said evaporated lying below said condenser;
   c. Providing a first transfer tank below said condenser and above said evaporator;
   d. Providing a first fill line leading from said condenser two said first transfer tank;
   e. Providing a first down blind leading from said first transfer tank two said evaporator;
   f. Providing a first flow control valve in said first fill line, said first flow control valve allowing flow from said condenser to said first transfer tank but preventing flow from said first transfer tank back to said condenser;

g. Providing a second flow control valve in said first dump line, said second flow control valve allowing flow from said first transfer tank to said evaporator but preventing flow from said evaporator back to said first transfer tank;

h. Providing a first vent line leading from said first transfer tank to said condenser;

i. Providing a second vent line leading from said first transfer tank to said evaporator, said second vent line having an opening in said evaporator that is above said second surface level of said working fluid within said evaporator;

j. Providing a first vent control valve in said first vent line;

k. Providing a second vent control valve in said second vent line;

l. Opening said first vent control valve, and closing said second vent control valve;

m. passing said liquid working fluid in said condenser through said first flow control valve and said first fill line into said first transfer tank under the influence of gravity and any gaseous working fluid contained within said first transfer tank is vented through said first vent line back to said condenser, said first vent line having an opening in said condenser that is above said first surface level of said working fluid within said condenser;

n. Closing said first vent control valve, and opening said second vent control valve; and o. passing said liquid working fluid in said first transfer tank through said second flow control valve and said first dump line into said evaporator under the influence of gravity and gaseous working fluid with said evaporator flows through said second vent line into said first transfer tank.

2. A method of transferring working fluid as recited in claim 1, further comprising:

a. providing a second transfer tank below said condenser and above said evaporator;

b. providing a second fill line leading from said condenser to said second transfer tank;

c. providing a second dump line leading from said second transfer tank to said evaporator;

d. providing a third flow control valve in said second fill line, said third flow control valve allowing flow from said condenser to said second transfer tank but preventing flow from said second transfer tank back to said condenser;

e. providing a fourth flow control valve in said second dump line said fourth flow control valve allowing flow from said second transfer tank to said evaporator but preventing flow from said evaporator back to said second transfer tank;

f. providing a third vent line leading from said second transfer tank to said condenser, said third vent line having an opening in said condenser that is above said first surface level of said working fluid within said condenser;

g. providing a fourth vent line leading from said second transfer tank to said evaporator, said fourth vent line having an opening in said evaporator that is above said second surface level of said working fluid within said evaporator;

h. providing a third vent control valve in said third vent line;

i. providing a fourth vent control valve in said fourth vent line;

j. opening said third vent control valve, and closing said fourth vent control valve;

k. whereby said liquid working fluid in said condenser flows through said third flow control valve and second fill line into said second transfer tank under the influence of gravity and any gaseous working fluid contained within said second transfer tank is vented through said third vent line back to said condenser;

l. closing said third vent control valve, and opening said fourth vent control valve; and m. whereby said liquid working fluid in said second transfer tank flows through said fourth flow control valve and said second dump line into said evaporator under the influence of gravity and gaseous working fluid within said evaporator flows through said second vent line into said second transfer tank.

3. A method of transferring working fluid as recited in claim 2, wherein as said first transfer tank is dumping said second transfer tank is filling.

4. A method of transferring working fluid as recited in claim 3, wherein as said first transfer tank is filling said second transfer tank is dumping.

5. A method of transferring working fluid as recited in claim 2, further comprising providing an auxiliary pump in said first fill line and said second fill line.

6. A method of transferring working fluid as recited in claim 2, further comprising providing an auxiliary pump in said first dump line and said second dump line.

7. A method of transferring working fluid as recited in claim 1, further comprising providing an auxiliary pump in said first fill line.

8. A method of transferring working fluid as recited in claim 1, further comprising providing a second auxiliary pump in said first dump line.

* * * * *